Patented Sept. 15, 1936

2,054,107

UNITED STATES PATENT OFFICE 2,054,107

METHOD OF MAKING AROMATIC KETONE AND ACID

Eric Wahlforss, Cleveland, Ohio, and Leo A. Goldblatt, Erie, Pa., assignors to The Glidden Company, Cleveland, Ohio, a corporation of Ohio No Drawing. Application April 13, 1934, Serial No. 720,442

6 Claims. (Cl. 260—131)

This invention relates to derivatives of the hydrocarbon retene, and has particular reference to a new and improved method of producing acetyl retene and alpha retene carboxylic acid, whereby the yields of such product are increased to the point where commercial application of the process is feasible.

Retene (1-methyl 7-isopropyl phenanthrene) is a hydrocarbon found in pine tar and other pine products, varying in amount according to the treatment the pine-tar has received. It is structurally related to abietic acid, a constituent of rosin; this acid is considered by most authorities to be a derivative of hydrogenated retene. Retene may be prepared from rosin with little difficulty; the reverse synthesis has never been accomplished.

In spite of the availability of retene on a commercial basis, little work has been done with this interesting hydrocarbon. Most investigators have been interested in proving the structure of retene, or in synthesizing abietic acid from it; their work has largely disregarded expense, as far as cost of reagents, apparatus and yields is concerned. The reason for the lack of commercial investigation may be due to the relative stability of the retene molecule; the common aromatic reactions (nitration, sulfonation, side chain oxidation and Friedel-Crafts reaction) being peculiarly difficult and complicated when applied to retene. The presence of the methyl and isopropyl groups seems to exert a steric hindrance effect; and the difficulties encountered have undoubtedly stopped research in numerous instances.

Bogert and Hasselström (J. Am. Chem. Soc. 53-3462 (1931)) describe a method of preparing methyl retyl ketone, or acetylretene by the Friedel-Crafts reaction, by the action of acetyl chloride, in the presence of anhydrous aluminum chloride, in carbon disulphide solution. This ketone may be oxidized to a monocarboxylic acid, as described by the same investigators in the Proceedings of the National Academy of Sciences Vol. 18–#6, pages 417–421 (June, 1932). The same acid may be made, as described by Komppa and Wahlforss (J. Am. Chem. Soc. 52-5009 (1930)) by the direct action of oxalyl chloride on retene.

By the method described above for preparing the acetyl retene, a yield of about 45% is reported. Moreover, in order to get any appreciable yield of crystalline ketone, it is necessary to prepare, crystallize and decompose the picrate. This low yield and complicated procedure make the process commercially unfeasible. In addition, carbon bisulphide is an objectionable solvent in large scale work, because of excessive inflammability, vile odor, and large evaporation loss.

We have found that the acetyl retene can be prepared on a commercial scale, with yields of the order of 80% of theoretical, by conducting the reaction using dry nitrobenzene as a solvent. The reaction is preferably started at temperatures of about 40–45° F. and may then be allowed to proceed at ordinary room temperatures. The reaction mixture is poured into cold water, and acidulated, whereby the nitrobenzene separates from the water. The nitrobenzene which contains acetyl retene is separated, and the solvent distilled off from the crude acetylretene. This may then be purified, as by vacuum distillation and/or recrystallization; the technically pure acetylretene is then oxidized to the acid, preferably with sodium hypochlorite.

As an example of this reaction, we dissolved 260 grams of retene in 750 grams of dry nitrobenzene, and added the cold solution to another cold solution of 350 grams of aluminum chloride in 1500 grams of dry nitrobenzene. 180 grams of acetyl chloride were added over a 30 minute period, keeping the temperature at 40–45° F. The mixture was refrigerated for another 30 minutes, then allowed to stand at room temperature overnight. The reaction mixture was decomposed by pouring over 2 kilograms of cracked ice, and 200 cc. of concentrated hydrochloric acid were stirred in. The lower nitrobenzene layer was drawn off and the nitrobenzene distilled. The crude ketone was vacuum distilled, boiling at 460–470° F. at 1 mm. pressure. The distillate was crystallized from 10 times its weight of hot methanol; white crystals melting above 90° C. were obtained in yield of about 250 grams. Fifty grams of the product, dissolved in 1250 cc. hot methanol, were then treated with 600 cc. of sodium hypochlorite solution (8% available chlorine) added slowly and with constant stirring. The sodium salt precipitated, and was filtered and washed free of hypochlorite. It was decomposed with dilute HCl, and the free acid was dried in the air and crystallized from xylene. The yield in this step was about 80%, an overall yield of about 65% of theoretical.

The method may be employed on a plant scale without serious fire hazard, and with negligible solvent losses. All solvents are recoverable, by distillation, in a relatively pure state; and the cost of the raw materials entering the process is relatively low.

Having described our invention, we claim:

1. The step in the method of making acetyl retene which comprises reacting upon retene, in dry nitrobenzene solution, with acetyl chloride, in the presence of anhydrous aluminum chloride.

2. The step in the method of making acetyl retene which comprises reacting at low temperatures upon retene, in dry nitrobenzene solution, with acetyl chloride, in the presence of anhydrous aluminum chloride.

3. The step in the method of making acetyl retene which comprises reacting at 40–45° F. upon retene, in dry nitrobenzene solution, with acetyl chloride, in the presence of anhydrous aluminum chloride.

4. The method of making acetyl retene which comprises reacting upon retene in dry nitrobenzene solution with acetyl chloride, in the presence of anhydrous aluminum chloride, separating the acetyl retene and nitrobenzene from the rest of the reaction mixture, removing the nitrobenzene and purifying the acetyl retene.

5. The method of making acetyl retene which comprises reacting at low temperatures upon retene in dry nitrobenzene solution with acetyl chloride, in the presence of anhydrous aluminum chloride, separating the acetyl retene and nitrobenzene from the rest of the reaction mixture, removing the nitrobenzene and purifying the acetyl retene.

6. The method of making acetyl retene which comprises reacting at 40–45° F. upon retene in dry nitrobenzene solution with acetyl chloride, in the presence of anhydrous aluminum chloride, separating the acetyl retene and nitrobenzene from the rest of the reaction mixture, removing the nitrobenzene and purifying the acetyl retene.

ERIC WAHLFORSS.
LEO A. GOLDBLATT.